United States Patent [19]
Lajoie

[11] Patent Number: 5,334,312
[45] Date of Patent: Aug. 2, 1994

[54] USE OF BICARBONATES IN THE BIODEGRADATION OF HYDROCARBON CONTAMINANTS

[75] Inventor: M. Stephen Lajoie, Basking Ridge, N.J.

[73] Assignee: Church & Dwight Co., Inc., Princeton, N.J.

[21] Appl. No.: 41,689

[22] Filed: Apr. 1, 1993

[51] Int. Cl.$^5$ ............................................. C02F 1/40
[52] U.S. Cl. .................... 210/610; 210/747; 210/922; 134/40
[58] Field of Search ............... 210/610, 611, 631, 922, 210/925, 747; 134/39, 40, 42

[56] References Cited

U.S. PATENT DOCUMENTS

| | | | |
|---|---|---|---|
| 4,042,495 | 8/1977 | Marconi et al. | 210/610 |
| 4,810,385 | 3/1989 | Hater et al. | 210/610 |
| 5,083,610 | 1/1992 | Sheehy | 210/610 |
| 5,225,083 | 7/1993 | Pappas et al. | 210/610 |

*Primary Examiner*—Thomas Wyse
*Attorney, Agent, or Firm*—Charles B. Barris

[57] ABSTRACT

A method is disclosed for treating a solid or liquid medium, e.g., soil or groundwater, which is contaminated with a hydrocarbon contaminant, e.g. diesel fuel or gasoline, by adding to the medium in the presence of water and at least one microorganism capable of metabolizing at least one hydrocarbon contaminant present, ammonium bicarbonate, sodium bicarbonate, or potassium bicarbonate, or combinations thereof, such that said hydrocarbon contaminant is eliminated or reduced to a desired lower level. The bicarbonate is added to the contaminated medium as a solution prepared by dissolving the bicarbonate or combination of bicarbonates in water, or as a solid bicarbonate or mixture of solid bicarbonates.

20 Claims, No Drawings

USE OF BICARBONATES IN THE BIODEGRADATION OF HYDROCARBON CONTAMINANTS

BACKGROUND OF THE INVENTION

1. Field of the Invention

This invention relates to an improved method for the elimination or reduction of contaminant hydrocarbons, e.g., in soil or groundwater, by biodegradation utilizing a bicarbonate.

2. Information Disclosure Statement Including Description of Related Art

The following information is disclosed in accordance with the provisions of 37 CFR 1.56, 1.97 and 1.98.

An environmental problem that has been receiving increasing attention is the contamination of soil and groundwater by hydrocarbons which have leaked or spilled from storage, pumping, production, transportation and other facilities involving the handling of such hydrocarbons.

It is well known that certain microorganisms are capable of eliminating hydrocarbons by utilizing them in their metabolism. Some of these microorganisms may be indigenous to the soil or groundwater into which hydrocarbons may spill or leak and spontaneously act to eliminate all or part of such hydrocarbons. In this connection, it has been found that various techniques increase the activity of the microorganism in reducing the content of the contaminating hydrocarbon, e.g., the addition of nitrogen or phosphorus-containing nutrients or the aeration of the soil or groundwater. In other instances, such hydrocarbon-metabolizing microorganisms may be added to the soil or groundwater to enhance the destruction of the hydrocarbons.

Attention is directed to the following related art which may be pertinent to the invention claimed herein.

U.S. Pat. No. 3,616,204, issued Oct. 26, 1971 to Linn, discloses the restoration of soil contaminated by hydrocarbon spillage by first disturbing the soil, as by plowing or discing, followed by inoculation with a hydrocarbon-consuming microorganism while controlling the nutrient and oxygen content of the soil. A nutrient medium may be applied comprising an aqueous solution of various salts including carbonates and sodium, potassium and ammonium salts.

U.S. Pat. No. 3,843,517, issued Oct. 22, 1974 to McKinney et al., discloses methods for elimination of oil slicks including the steps of absorbing a culture of hydrocarbon-consuming microorganisms on a carrier such as a clay and applying the microorganism-containing carrier to the oil slick. The microorganisms are cultured in an aqueous nutrient medium of salts, e.g., sodium carbonate.

U.S. Pat. No. 4,042,495, issued Aug. 16, 1977 to Marconi et al., teaches the removal of oil hydrocarbon pollutants from the surface of water by scattering over the polluted surface solid particles of nutrient salt containing nitrogen and phosphorus in a form assimilable by microorganisms capable of metabolizing hydrocarbons. The salt particles are coated with paraffin to render them buoyant and slowly soluble in water. Ammonium bicarbonate is included in the formation of tablets of the nutrient salt but is thermally decomposed to increase the porosity of the tablets prior to their utilization.

U.S. Pat. No. 4,124,501, issued Nov. 7, 1978 to Yen et al., discloses the purification of oil shale retort water by adding anaerobic bacteria to increase cell biomass and reduce sulfate ions to sulfide. The cell biomass is then aggregated into a flocculent mass and removed. Table 1 of the disclosure indicates that bicarbonate ions are included in the solids content of the oil shale retort water.

U.S. Pat. No. 4,401,569, issued Aug. 30, 1983 to Jhaveri et al., teaches a method and apparatus for treating hydrocarbon and halogenated hydrocarbon-contaminated ground and groundwater utilizing microorganisms, the growth of which is enhanced by the addition of nutrients such as sodium carbonate.

SUMMARY OF THE INVENTION

In accordance with this invention a method is provided for treating a solid or liquid medium, e.g., soil or groundwater, contaminated with a hydrocarbon contaminant, by adding to the medium in the presence of water and at least one microorganism capable of metabolizing at least one hydrocarbon compound present, ammonium bicarbonate (ABC), sodium bicarbonate (SBC), or potassium bicarbonate (KBC) or combinations thereof, such that the hydrocarbon contaminant is eliminated or reduced to a desired lower level. The bicarbonate is added to the contaminated medium as a solution prepared by dissolving the bicarbonate or combination of bicarbonates in water, or as a solid bicarbonate or mixture of solid bicarbonates.

The use of a bicarbonate in the method of this invention provides a valuable nutrient effective in enhancing the propagation of the hydrocarbon-metabolizing microorganism without causing any undesirably large increase or decrease in the pH in any localized area of the medium being decontaminated.

DETAILED DESCRIPTION OF THE INVENTION

The media which may be treated by the method of this invention include soils of varying geologic types, pH's (within the prescribed limits), and levels of organic matter, which are utilized for different purposes, such as farmland and garden soils, sandy, pebble and rocky beaches, and fresh, brackish or saline groundwater existing in a wide variety of geologic formations. The average initial pH of the contaminated medium before the addition of bicarbonate may be in the range, for example of about 6.0 to 8.0, preferably about 6.5 to 7.5, the "initial pH" of the contaminated medium being defined as the pH of any aqueous phase present in the medium before the addition of bicarbonate. If substantially no aqueous phase is present before such addition, the initial pH is defined as the pH of the nonflooding aqueous phase which forms on the addition of water.

If the contaminated medium, e.g. soil, is more acidic before treatment than is indicated by the foregoing pH range, i.e., the pH is lower than about 6, then it may be necessary to treat the medium with mild alkali such as hydrated lime to bring the pH within the defined range in order to obtain the desired level of propagation of hydrocarbon-metabolizing microorganisms by the method of this invention, with a resulting elimination of hydrocarbon contaminant.

The contaminating hydrocarbon to be eliminated by the method of the invention may be any complex mixture or single compound which may accidentally leak or spill into the surroundings during its manufacture, transportation, storage, or any other handling or use of the material. Such hydrocarbons may be for example a crude oil, gasoline, naphtha, kerosene, diesel fuel, fuel oil, gas oil, lubricating oil, benzene, toluene, isooctane, etc.

The class of microorganisms capable of metabolizing hydrocarbons and which can be utilized in the method of this invention are well-known in the art and include, for example, the following species: *Pseudomonas methanica, Pseudomonas methanitrificans, Pseudomonas aeruginosa, Pseudomonas boreopolis, Pseudomonas fluorescens, Pseudomonas syringal, Pseudomonas natriegens, Pseudomonas oleovorans, Methanomonas methanica, Desulfovibrio desulfuricans, Micrococus paraffinae, Achromobacter agile, Achromobacter centropunctatum, Bacterium aliphaticum, Bacterium benzoli, Bacterium hidium, Bacterium naphtha linicus, Bacillus amylobacter, Bacillus megaterium, Bacillus subtillis, Bacillus hexacarbovorum, Bacillus tolulicum, Mycabacterium album, Mycobacterium rubrum, Mycobacterium lactiocola, Nocardia opacus, Nocardia corallina, Nocardia farcinica, Actinomyces oligocarbophilus, Candida pulchenine, Candida utiliz, Candida tropicolis, Candida lipolytica, Methylococcus capsulatus, Aerobacter aerogenus,* and various species of Debaryomyces, Endomyces, Hansenia, Monillia, Oidila Torulopis, and Streptomyces. The hydrocarbon contaminant is more often than not a complex mixture of compounds such as gasoline or diesel fuel in which case a group of microorganisms are preferably present, since different specific microorganisms may be more efficient in metabolizing certain hydrocarbons than others, and a group of microorganisms is more likely to metabolize a higher percentage and a larger number of the hydrocarbon compounds than a single microorganism. Many soils and groundwaters involved in hydrocarbon leaks or spills contain a large enough indigenous group of hydrocarbon-metabolizing microorganisms such that the latter group is sufficient to achieve the desired reduction of hydrocarbon contaminant within a certain period of time. In this case, the method of the invention may have the effect of shortening the period necessary to achieve such reduction in hydrocarbons. Thus, such method may enhance the growth of indigenous hydrocarbon-metabolizing microorganisms and propagate them to a sufficient population to be effective in eliminating or sufficiently reducing the content of the hydrocarbon contaminant in a significantly shorter time than when the method is not practiced. In other cases, particularly when a single compound or a mixture of relatively few compounds make up the contaminant, the indigenous hydrocarbon-metabolizing microorganisms may not be sufficient to eliminate or reduce the content of the contaminant in a reasonable time even when the method of the invention is practiced. In these cases, it will be necessary as part of the method to inoculate the contaminated medium with a single microorganism or a group of microorganisms which is known to be effective in metabolizing the compound or compounds of the contaminant within a reasonable period.

In some cases, particularly where soil has been contaminated which is fairly wet, i.e., has a water content at its surface and throughout the area of contamination, the bicarbonate may be added as solid particles which will tend to dissolve at the surface and diffuse throughout the aqueous phase of the contaminated area where it can be utilized by the microorganisms to enhance their propagation and thus their ingesting and metabolizing of the hydrocarbons present. In most cases, however, the bicarbonate will be added as an aqueous solution which can easily penetrate the contaminated area and accomplish the same purpose of microorganism propagation and their hydrocarbon ingestion and metabolization. In cases where there is little or no water present in the contaminated medium, e.g. spillage or leakage of crude oil into hot desert sand, it is mandatory either to apply the bicarbonate as an aqueous solution or if applied as a solid, to add water before or after the addition of solid bicarbonate so as to form an aqueous solution in situ. Furthermore, it may be necessary to add water intermittently to make up for that lost by evaporation.

The concentration and amount of bicarbonate solution added to the contaminated medium may be varied widely depending on the nature and structure of the medium and area of contamination. In general, a sufficient amount of bicarbonate is added so that due to increased propagation of hydrocarbon-metabolizing microorganisms, the amount of any contaminant is eliminated or reduced to a desired low level within a reasonable period of time.

The average rise in pH caused by the addition of bicarbonate may be in the range, for example of about 1.5 to 3.5, preferably about 2 to 3, and the average final pH after the addition of bicarbonate may be, for example, no higher than about 9.5, preferably no higher than about 8.5. To accomplish the foregoing rise in pH, the concentration of the bicarbonate salt employed in the treatment in the aqueous phase present in the medium may be in the range, for example, of about 0.05 wt. % up to the maximum solubility in water of the bicarbonate at the treatment temperature, with the actual concentration depending on various factors such as the nature and structure of the medium being treated and the nature and count of the hydrocarbon metabolizing microorganisms employed.

When the contaminated medium being treated is soil or sand, it may be advantageous in some instances, particularly when the hydrocarbon-metabolizing microorganisms are largely aerobic rather than anaerobic and/or the soil or sand is tightly-packed or has a high degree of clumpiness, to break up or turn over the soil or sand, e.g., by plowing or disking. This allows for better circulation of oxygen through the soil or sand which in turn increases microorganism propagation and hydrocarbon metabolism.

It may also be advantageous in some instances, in order to obtain a high degree of degradation of hydrocarbon contaminant, to add to the contaminated medium with the bicarbonate salt of the invention one or more ammonium, sulfate or phosphate salts, e.g., ammonium sulfate, sodium, potassium or ammonium phosphate, or magnesium ammonium phosphate, or an organic nutrient such as urea. As is the case when a bicarbonate salt is used alone, the pH of the contaminated medium containing a bicarbonate and one or more additional nutrient salts may be controlled so that the initial pH of the contaminated medium and its pH after the treatment of this invention is carried out, are within the ranges set out previously.

Ammonium bicarbonate (ABC) is a preferred bicarbonate under this invention when a single bicarbonate is used, since, as indicated in the previous paragraphs, it contributes both a bicarbonate anion and an ammonium cation which also acts as a nutrient for the hydrocarbon-metabolizing microorganisms. However, even more preferred than the use of ABC alone is the use of a combination of ABC and potassium bicarbonate (KBC), with the ABC providing nitrogen as a nutrient and an initial rise in pH, and the KBC providing an alkaline buffer reserve to maintain pH and also potassium as a nutrient to the soil for future plant growth, if the contaminated medium is a form of garden soil. If a combination of ABC and KBC is utilized as the bicarbonate in the method of the invention, the ABC may be present, for example, within the range of about 15 to 75 wt. %, preferably about 35 to 55 wt. %, based on the total weight of ABC and KBC.

When the bicarbonate and any other nutrient salt which may be contemplated are added as an aqueous solution, such solution may be applied to the contaminated medium using any technique of application known in the art, e.g., any conventional spraying or irrigation technique.

The invention is further illustrated by the following examples.

EXAMPLES 1-3 AND COMPARATIVE EXAMPLE A

A batch of typical garden soil rich in organic matter was sifted to remove obvious organic matter and large stones using a 2-5 mm screen. The soil was separated into 100 g samples to which were added 5 ml of sterile water and 5 g of #2 diesel fuel to form untreated contaminated garden soil samples which were separated into five test categories, a first category to each of which no nutrient salt was subsequently added being designated as "Control A"; a second category to each of which was added 0.127 g of ammonium bicarbonate (ABC) being designated "Example 1"; a third category to each of which was added 0.254 g of sodium bicarbonate (SBC) being designated "Example 2"; a fourth category to each of which was added 0.2 g of potassium bicarbonate (KBC) being designated as "Example 3" and a fifth category to each of which was added 0.212 g of ammonium sulfate being designated as "Comparative Example A". The quantities of additive salt were determined in accordance with the general ratio of 1 nitrogen atom to 100-200 carbon atoms, which is believed to be optimal for the enhancement of microbial growth of hydrocarbon-utilizing microorganisms.

The average pH's of the various samples were measured at periodic intervals from 0 to 8 weeks from the point at which the water bicarbonate and diesel fuel were added to the samples. The results are shown in Table 1.

TABLE I

| Sample | Average pH - Garden Soil |  |  |  |  |  |
|---|---|---|---|---|---|---|
| | Time in Weeks |  |  |  |  |  |
| | 0 | 1 | 2 | 3 | 4 | 8 |
| Control A | 7.39 | 7.01 | 7.54 | 7.33 | 7.39 | 7.43 |
| Ex. 1 (ABC) | 9.01 | — | 8.25 | 7.85 | 8.28 | 6.66 |
| Ex. 2 (SBC) | 7.70 | 9.10 | 9.30 | 8.99 | 9.12 | 8.61 |
| Ex. 3 (KBC) | 8.07 | 8.68 | 8.85 | 8.56 | — | 8.08 |
| Comp. Ex. A | 7.14 | — | 6.90 | 6.36 | 5.85 | 5.78 |

The results shown in Table I indicate that the addition of each of the three bicarbonates of this invention resulted in a pH above 7.5 for all of the intervals except those 8 weeks after the addition of diesel fuel and ABC (Example 1), where a pH of 6.66 was obtained. Levels of pH greater than 7.5 are generally considered advantageous for bioremediation procedures, and preferably a pH of around 8. In contrast, as shown in the results of Comparative Example A, the addition of ammonium sulfate which is a commonly used fertilizing additive in current bioremediation practices resulted in pH values below 6.0 after 4 and 8 weeks which tend to be detrimental to microbial activity.

Hydrocarbon-utilizing microorganism counts (measuring organisms capable of utilizing a hydrocarbon as their carbon source) of the foregoing samples, except for those including ammonium sulfate (Comparative Example A), were made at 0 time and 1, 2, 3, 5 and 8 weeks. The counts were performed by making a 1:10 initial dilution of 1 gram of the sample soil into 9 ml of pH 7.2 buffer. Further dilutions were made as needed. The pour plate method was used by pipetting 1 ml of the sample dilution into sterile petri dishes. Bushnell-Haas agar with 0.5% diesel fuel as growth media was added to the plate and swirled to mix. Incubation was at 25° C. for up to 5 days. After the incubation period, samples were enumerated using a Quebec Colony Counter.

In addition to using the Bushnell-Haas (BH) agar to enumerate hydrocarbon utilizing bacteria, Bushnell-Haas broth was utilized in the Most Probable Number (MPN) method. Counts were calculated on the ability of a sample dilution to show growth or no growth in 3 separate sets of 5 tubes each.

The results are shown in Table II.

TABLE II

| | Number of Hydrocarbon-Utilizing Microorganisms (Count/g Soil) Garden Soil - MPN Method | | | | | |
|---|---|---|---|---|---|---|
| | Time in Weeks | | | | | |
| | 0 | 1 | 2 | 3 | 5 | 8 |
| Control A | $>1.6 \times 10^9$ | $8.0 \times 10^8$ | $3.0 \times 10^9$ | $>1.6 \times 10^{11}$ | $1.7 \times 10^{10}$ | $9.0 \times 10^9$ |
| Ex. 1 (ABC) | $>1.6 \times 10^9$ | $5.0 \times 10^{10}$ | $3.5 \times 10^{10}$ | $>1.6 \times 10^{11}$ | $7.0 \times 10^{10}$ | $2.0 \times 10^9$ |
| Ex. 2 (SBC) | $2.3 \times 10^7$ | $2.6 \times 10^9$ | $5.0 \times 10^9$ | $>1.6 \times 10^{11}$ | $2.2 \times 10^{11}$ | $3.3 \times 10^{10}$ |
| Ex. 3 (KBC) | $9.0 \times 10^8$ | $3.5 \times 10^9$ | $7.0 \times 10^9$ | $3.0 \times 10^9$ | $5.0 \times 10^{11}$ | $8.0 \times 10^9$ |

The results of Table II show that except for the sample containing KBC after 3 weeks (Example 3), the presence of any of the bicarbonate salts in the samples for the periods up to 5 weeks (Examples 1-3) indicate either an increase or an indeterminate change in the number of hydrocarbon-utilizing microorganisms compared with the absence of any bicarbonate (Control A). The reduction in the number of microorganisms in all samples after 8 weeks may indicate a delayed destructive effect on the propagation of microorganisms in isolated samples, possibly due to an excessively high population of the microorganisms or depletion of some essential nutrient.

To determine hydrocarbon loss, the hydrocarbon content of the various samples as Total Petroleum Hydrocarbons (TPHC) were determined by Freon extraction and infra-red (IR) analysis at intervals after addition of the diesel fuel contaminant and bicarbonate salt, if used, of 0 time and 1, 2, 3, 5 and 8 weeks. The results are shown in Table III.

TABLE III

Hydrogen Content - Garden Soil
(Grams of diesel fuel)

| Sample | Time in Weeks | | | | |
|---|---|---|---|---|---|
| | 0 | 1 | 2 | 3 | 5 | 8 |
| Control A | 6.70 | 5.36 | 6.58 | 6.25 | 5.87 | 5.76 |
| Ex. 1 (ABC) | 6.17 | 6.02 | 5.88 | 5.22 | 4.43 | 4.07 |
| Ex. 2 (SBC) | 6.53 | 5.68 | 5.63 | 6.40 | 5.87 | 5.25 |
| Ex. 3 (KBC) | 7.27 | 5.10 | 5.31 | 6.10 | 5.84 | 5.30 |

(Note: The absolute values of TABLE III are inflated due to the fact that IR analysis picks up the hydrogen in water as well as the hydrocarbons present. However, the values are believed to have relative significance.)

While the specific values given in Table III may be somewhat unreproducible due to the possible presence of water during the IR analysis, such values nevertheless are believed to indicate the relative overall effectiveness of the bicarbonate salts in removing hydrocarbons from garden soil by bioremediation. In particular, the soil samples containing each of the bicarbonate salts show a greater removal of diesel fuel from the sample after eight weeks than the control samples which contained no bicarbonate. Moreover, Example 3 containing ABC shows a greater removal of diesel fuel than all the other samples after 8 weeks of bioremediation.

Finally, the elimination of $C_{10}$–$C_{22}$ alkanes from the sample of Example 1 containing ABC after 13 weeks of bioremediation was determined by recovering the hydrocarbons remaining in the sample by soxhlet extraction with methylene chloride and analysis by gas chromatography and mass spectometry (GC/MS). It was found that after the 13 week period of bioremediation, the sample of Control A with no bicarbonate present contained 776 ppm of $C_{10}$–$C_{22}$ alkanes while the sample of Example 1 to which ABC was added contained 521.2 ppm of $C_{10}$–$C_{22}$ alkanes indicating an increased removal by bioremediation of 254.8 ppm of the latter hydrocarbons from the sample of Example 1 due to the presence of ammonium bicarbonate.

EXAMPLES 4–6 (FROM PERRITT REPORT)

The procedures described in Examples 1–3 were followed except that, in place of garden soil, a farm soil relatively low in organic matter and somewhat sandy, was utilized. The soil samples containing water and diesel fuel contaminant to which no bicarbonate was added is designated as Control B, while the samples to which ABC, SBC and KBC were added are designated as Examples 4, 5 and 6 respectively.

The average pH's of the samples at intervals of 0 time and 1, 2, 4 and 8 weeks after the addition of diesel fuel and bicarbonate are shown in Table IV.

TABLE IV

Average pH of Samples - Farm Soil

| Sample | Time in Weeks | | | | |
|---|---|---|---|---|---|
| | 0 | 1 | 2 | 4 | 8 |
| Control B | 6.77 | 7.05 | 7.00 | 6.97 | 6.77 |
| Ex. 4 (ABC) | 7.96 | 8.33 | 8.31 | 7.90 | 6.93 |
| Ex. 5 (SBC) | 8.08 | 8.94 | 8.83 | 8.61 | 8.61 |
| Ex. 6 (KBC) | 7.37 | 8.55 | 8.40 | 8.29 | 7.92 |

The results shown in Table IV indicate an improvement, i.e., rise, of the pH of all samples containing any of the bicarbonate salts of this invention as compared with the control samples containing no bicarbonate, at all intervals of testing. Moreover, the pH of all the samples except those of Example 4 eight weeks after the addition of diesel fuel and ABC, were 7.5 or above, considered advantageous for bioremediation, and the pH of none of the samples fell below 6.0, a level considered detrimental to microbial activity.

The results of the counts of hydrocarbon-utilizing microorganisms at intervals of 0 time and 1, 2, 3, 5 and 8 weeks are shown in Table V.

TABLE V

Number of Hydrocarbon-Utilizing Microorganisms (Count/g Soil)
Farm Soil - MPN Method

| | Time in Weeks | | | | | |
|---|---|---|---|---|---|---|
| | 0 | 1 | 2 | 3 | 5 | 8 |
| Control B | $1.6 \times 10^9$ | $1.3 \times 10^9$ | $1.3 \times 10^{10}$ | $5.0 \times 10^9$ | $5.0 \times 10^9$ | $2.0 \times 10^9$ |
| Ex. 4 (ABC) | $>1.6 \times 10^9$ | $2.4 \times 10^{10}$ | $2.2 \times 10^{10}$ | $8.0 \times 10^8$ | $1.6 \times 10^{11}$ | $2.0 \times 10^9$ |
| Ex. 5 (SBC) | $>1.6 \times 10^9$ | $2.2 \times 10^9$ | $5.0 \times 10^9$ | $1.1 \times 10^9$ | $1.6 \times 10^{11}$ | $2.0 \times 10^9$ |
| Ex. 6 (KBC) | $>1.6 \times 10^9$ | $7.0 \times 10^8$ | $7.0 \times 10^8$ | $3.4 \times 10^9$ | $2.4 \times 10^{10}$ | $2.0 \times 10^9$ |

The results of Table V show that the samples containing ABC and SBC (Examples 4 and 5) contained an increase in hydrocarbon-utilizing microorganisms 1 and 2 weeks after the addition of the bicarbonate while all the samples containing a bicarbonate salt (Example 4–6) showed an increase in such microorganisms 5 weeks after the addition of the bicarbonate, as compared with the samples containing no bicarbonate (Control B). As in the case of Control A and Examples 1–3, the reduction of hydrocarbon-utilizing microorganisms in the samples of Control B and Examples 4–6 after eight weeks may indicate the presence of a delayed destructive effect on the propagation of microorganisms in isolation, again possibly due to their excessively high population or depletion of some essential nutrient.

The hydrocarbon content of the various samples determined by Freon extraction and IR analysis is shown in Table VI.

TABLE VI

Hydrocarbon Content - Farm Soil
(Grams of diesel fuel)

| Sample | Time in Weeks | | | | |
|---|---|---|---|---|---|
| | 0 | 1 | 2 | 3 | 5 | 8 |
| Control B | 4.34 | 19.4* | 5.53 | 4.54 | 5.19 | 4.43 |
| Ex. 4 (ABC) | 3.39 | 2.39 | 4.71 | 3.66 | 4.21 | 4.41 |
| Ex. 5 (SBC) | 2.70 | 3.86 | 4.23 | 2.69 | 4.08 | 3.28 |
| Ex. 6 (KBC) | 2.96 | 3.17 | 4.35 | 4.08 | 2.21 | 3.28 |

(*Note: This value is believed to be anamolous due to some heterogeneity in the samples listed.)

The values shown in Table VI indicate that the amount of diesel fuel contaminant removed from the farm soil samples by bioremediation is considerably improved by the addition of each of the bicarbonate salts of this invention at all the indicated intervals of time from the addition of diesel fuel and bicarbonate to the soil, as compared with the control sample wherein no bicarbonate salt was added.

As determined by soxhlet extraction with methylene chloride and GC/MS analysis, the amount of benzene plus $C_{10}$-$C_{22}$ alkanes present in a Control B sample (to which no bicarbonate was added) and in an Example 4 sample (to which ABC was added), both after 13 weeks of bioremediation, were 2069 and 535 ppm respectively. This indicates that the presence of ABC caused the removal of an additional amount of 1534 ppm of these heavier hydrocarbons by bioremediation.

I claim:

1. A method for treating a solid or liquid medium contaminated with a hydrocarbon contaminant by adding to the medium in the presence of water and at least one microorganism capable of metabolizing at least one hydrocarbon compound present, a salt composition comprising a bicarbonate selected from the group consisting of ammonium bicarbonate, potassium bicarbonate, and mixtures thereof, said salt composition yielding ammonium and bicarbonate ions when dissolved in water, such that said hydrocarbon contaminant is eliminated or reduced to a desired lower level, said salt composition being added to said medium as a solution prepared by dissolving the composition in water, or as a solid composition.

2. The method of claim 1 wherein said salt composition comprises ammonium bicarbonate.

3. The method of claim 1 wherein said salt composition comprises potassium bicarbonate and an ammonium salt.

4. The method of claim 1 wherein said salt composition comprises ammonium bicarbonate and potassium bicarbonate.

5. The method of claim 4 wherein said ammonium bicarbonate is present in the range of about 15 to 75 wt. % based on the total weight of ammonium and potassium bicarbonates.

6. The method of claim 5 wherein said range is about 35 to 55 wt. %.

7. The method of claim 1 wherein said medium is soil.

8. The method of claim 1 wherein said medium is groundwater.

9. The method of claim 1 wherein the pH of the medium before the addition of said salt composition is from about 6.0 to 8.0.

10. The method of claim 9 wherein said pH is from about 6.5 to 7.5.

11. The method of claim 9 wherein the rise in pH caused by the addition of said salt composition is in the range of about 1.5 to 3.5.

12. The method of claim 11 wherein said rise in pH is in the range of about 2 to 3.

13. The method of claim 1 wherein said contaminant is crude oil.

14. The method of claim 1 wherein said contaminant is diesel fuel.

15. The method of claim 1 wherein said contaminant is gasoline.

16. The method of claim 1 wherein said microorganism is indigenous to said contaminated medium.

17. The method of claim 1 wherein said microorganism is added to said medium.

18. The method of claim 1 wherein said salt composition is added as an aqueous solution.

19. The method of claim 1 wherein said salt composition is added as solid particles.

20. The method of claim 1 wherein the concentration of said bicarbonate in the aqueous phase present in said medium is in the range of about 0.05 wt. % up to the maximum solubility in water of the bicarbonate at the treatment temperature.

* * * * *